C. G. WRIGHT.
TIRE ARMOR.
APPLICATION FILED MAR. 13, 1908.
947,141.
Patented Jan. 18, 1910.
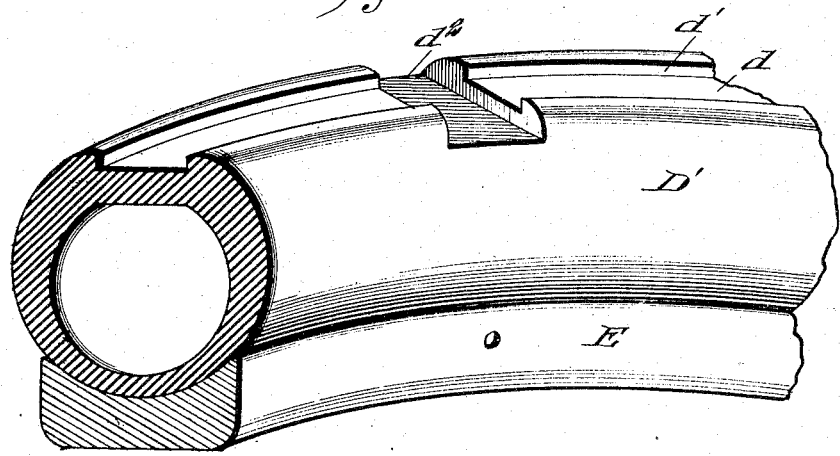
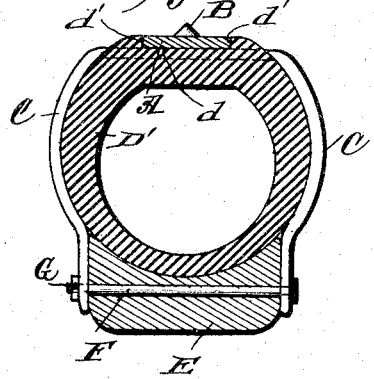
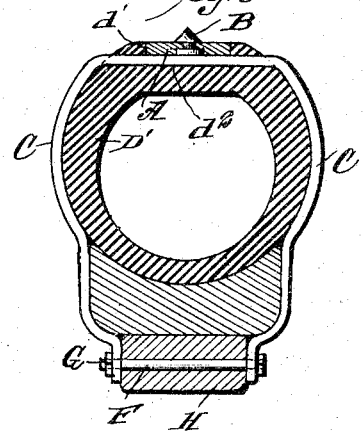
WITNESSES
E. M. Callaghan
C. E. Tramer
INVENTOR
CLEM G. WRIGHT
BY Munn & Co.
ATTORNEYS

UNITED STATES PATENT OFFICE.

CLEMENT G. WRIGHT, OF GREENSBORO, NORTH CAROLINA.

TIRE-ARMOR.

947,141. Specification of Letters Patent. Patented Jan. 18, 1910.

Application filed March 13, 1908. Serial No. 420,778.

*To all whom it may concern:*

Be it known that I, CLEMENT G. WRIGHT, a citizen of the United States, and a resident of Greensboro, in the county of Guilford and State of North Carolina, have made certain new and useful Improvements in Tire-Armors, of which the following is a specification.

My invention is an improvement in tire armors and consists in certain novel constructions and combinations of parts hereinafter described and claimed.

In the drawing—Figure 1 is a perspective view of a portion of a tire and rim provided with grooves for receiving the armor. Fig. 2 is a section through the tire and rim with the armor in place, and Fig. 3 is a similar view taken on the line of the holder.

In the present embodiment of my invention, the armor consists of an endless strip or band A, provided at intervals with headed rivets B, the band being flat transversely as shown in Figs. 2 and 3.

At suitably spaced intervals, the band has secured thereto by the rivets B, straps C, the ends of which are adapted to seat on each side of the tire D and of the rim E, the free ends of the straps being provided with openings through which is passed a bolt F, the bolt being secured in place by a nut G.

The bolts F may traverse the rim E, as shown in Fig. 2 or blocks H may be arranged on the inner face of the rim and between the spokes as shown in Fig. 3, through which the bolts are passed.

The band A is preferably formed from a flexible flat steel strip, of a suitable thickness and of a suitable width. The rivets are for the purpose of increasing the friction between the wheel and the roadway.

The holders C are preferably of leather, but may be of any suitable material.

As shown in Fig. 1, the tire D' is provided with a peripheral groove $d$ whose side walls $d'$ are perpendicular, and with transverse grooves $d^2$ for receiving the holder as shown in Fig. 3. In this construction the sides of the band bear against the side walls of the groove and the holders C may be connected with the rim E as shown in Fig. 2 or with the blocks H as shown in Fig. 3.

I claim:—

The combination with a tire having a peripheral groove provided with parallel side walls, and with spaced transverse grooves intersecting the peripheral groove and of greater depth, of a tire armor consisting of a flexible endless strip or band having at spaced intervals headed rivets, the heads of the rivets being on the outer surface of the band, said band having a thickness equal to the depth of the groove, so that the heads of the rivets project beyond the periphery of the tire, and fastening devices consisting of a body portion secured to the band at spaced intervals with respect to each other, said body portions being secured to the under face of the band, and seating in the transverse grooves, and arms, adapted to embrace the tire and provided with means whereby they may be secured to the rim of the wheel.

CLEM. G. WRIGHT.

Witnesses:
 N. S. THOMPSON,
 JAS. S. PHIPPS.